(12) United States Patent
Neff et al.

(10) Patent No.: US 11,493,083 B2
(45) Date of Patent: Nov. 8, 2022

(54) GREASELESS SWIVEL AND BEARING DEVICE

(71) Applicant: REINKE MANUFACTURING CO., INC., Deshler, NE (US)

(72) Inventors: Darin Joseph Neff, Hebron, NE (US); Bradley George Weatherl, Fairbury, NE (US); Mark Randall Virus, Hebron, NE (US); Russell Scott Reinke, Davenport, NE (US); Jon Patrick Henry, Deshler, NE (US)

(73) Assignee: REINKE MANUFACTURING CO., INC., Deshler, NE (US)

( * ) Notice: Subject to any disclaimer, the term of this patent is extended or adjusted under 35 U.S.C. 154(b) by 794 days.

(21) Appl. No.: 16/377,651

(22) Filed: Apr. 8, 2019

(65) Prior Publication Data

US 2020/0318678 A1 Oct. 8, 2020

(51) Int. Cl.
*F16C 17/02* (2006.01)
*F16C 11/04* (2006.01)
*F16L 27/08* (2006.01)

(52) U.S. Cl.
CPC .............. *F16C 17/02* (2013.01); *F16C 11/04* (2013.01); *F16L 27/0812* (2013.01)

(58) Field of Classification Search
CPC ........ F16C 17/02; F16C 11/04; F16C 33/201; F16C 33/08; F16L 27/0812
See application file for complete search history.

(56) References Cited

U.S. PATENT DOCUMENTS

| | | | | | |
|---|---|---|---|---|---|
| 3,829,134 | A | * | 8/1974 | Hutchison | F16L 27/093 285/190 |
| 3,838,718 | A | * | 10/1974 | Flory | B63B 22/021 285/190 |
| 4,326,736 | A | * | 4/1982 | Kusumi | E21B 21/02 285/98 |
| 4,449,739 | A | * | 5/1984 | Raether | F16L 27/0824 285/98 |

(Continued)

OTHER PUBLICATIONS

Non-Final Office Action dated Feb. 3, 2022 in U.S. Appl. No. 16/527,901, 14 pages.

*Primary Examiner* — James M Hewitt, II
(74) *Attorney, Agent, or Firm* — Shook Hardy & Bacon, L.L.P.

(57) ABSTRACT

A greaseless pivot center swivel and bearing device includes an outer housing having a sidewall with top and bottom portions, a top plate coupled with the top portion that includes an opening therein, and a bottom plate coupled with the bottom portion that includes an opening therein. The sidewall cooperates with the top and bottom plates to define an interior volume. A single, unitary bushing member formed of a low-friction material is positioned within the interior volume and includes a surface cylindrically curved about an axis extending between the top and bottom plates of the housing. The cylindrically curved surface cooperates with the openings in the top and bottom plates to define a cylindrical passage through the interior volume sized and shaped for receiving a cylindrical tube that rotates therein, e.g., a tube configured to connect with a water supply column of a mechanized irrigation system.

19 Claims, 8 Drawing Sheets

(56) References Cited

U.S. PATENT DOCUMENTS

| | | | |
|---|---|---|---|
| 6,588,778 B1 * | 7/2003 | McLaughlin | B60B 35/04 |
| | | | 280/124.13 |
| 2010/0201120 A1 * | 8/2010 | Bolivar | F16L 27/0816 |
| | | | 285/108 |
| 2014/0124050 A1 * | 5/2014 | Tix | F16L 39/00 |
| | | | 137/315.01 |
| 2016/0356403 A1 * | 12/2016 | Perrigo | B64D 45/02 |
| 2017/0009923 A1 * | 1/2017 | Chavan | F16L 37/138 |
| 2018/0016756 A1 * | 1/2018 | Beckman | E01C 19/46 |
| 2020/0315109 A1 | 10/2020 | Rempe et al. | |

\* cited by examiner

GREASELESS SWIVEL AND BEARING DEVICE

TECHNICAL FIELD

The present disclosure relates to a rotational swivel and bearing device. In particular, the present disclosure relates to a rotational swivel and bearing device for a center pivot irrigation unit that uses a greaseless bearing and provides a substantially maintenance-free design. The present disclosure further relates to a greaseless swivel and bearing assembly.

BACKGROUND

The following discussion of the background of the disclosure is intended to facilitate an understanding of the present disclosure. However, it should be appreciated that the discussion is not an acknowledgement or admission that any of the referenced material was published, known, or part of the common general knowledge as of the priority date of the application. Some embodiments of the disclosure are described herein with reference to mechanized irrigation equipment and/or systems. However, it will be understood and appreciated by those having ordinary skill in the art that embodiments of the disclosure are not limited to mechanized irrigation system applications and may be used in other applications having rotating or swiveling mechanical parts.

Mechanized irrigation systems provide the ability to manage water resources and, in some instances, other liquids. For example, mechanized irrigation systems can enable application of an optimal amount of water at critical times during a crop's life cycle, fortifying crop health and maximizing yield potential. While there are many components that make up mechanized irrigation systems, in a general sense, such systems include a mechanical structure, a drivetrain, and a control system. One common type of mechanized irrigation systems is a center pivot arrangement that includes a center point about which the system rotates or swivels. The center point may include a rotational swivel and bearing assembly that supports a span. A "span," as the term is used herein, is a structural assembly comprised of a horizontal irrigation pipeline, struts and braces, and a truss rod connection system. A pivot center swivel and bearing assembly provides a swiveling connection between a vertical water supply column coming out of the ground and the horizontal irrigation pipeline that delivers water to a plurality of sprinklers. An upper portion of a swivel elbow component is coupled with the horizontal irrigation pipeline. A lower portion of the swivel elbow component extends vertically down through a bearing and is coupled to the vertical water supply column. Conventionally, the bearing is a circular tube having an inner diameter slightly larger than the outer diameter of the vertical portion of the swivel elbow component.

The pivot center swivel and bearing assembly supports multiple axial loads from the connecting span (or spans) that are exerted upon the assembly during periods of operation or standing still. Due to the high and/or continual loads, for free and effective rotational movement to occur, it is common to use grease or other similar material to provide the lubrication needed for the span rotation to occur freely. The grease is applied between the water supply column and the bearing during regular maintenance intervals to keep the assembly lubricated. Due to the sustained loads and fluctuations in temperature, this grease can excrete out of the bearing causing damage within the bearing and to adjacent components such as rubber gasket style connections. In general, the excreted grease can also spill onto other components such as meters, sensors, electrical wiring and walking platforms causing a mess in and around the pivot center assembly.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Aspects of the disclosure provide a greaseless pivot center swivel and bearing device that is substantially maintenance free and prevents damage to other components of a mechanized irrigation system caused by lubricant leakage and/or spillage, as well as reduces the mess occasioned by such leakage/spillage. The greaseless pivot center swivel and bearing device includes an outer housing having a sidewall, a top plate, a bottom plate and a plurality of bushing members. The sidewall of the outer housing includes a top portion and a bottom portion. The top plate is coupled with the top portion of the sidewall and the bottom plate is coupled with the bottom portion of the sidewall. Each of the top and bottom plates includes an opening therein. The sidewall of the outer housing, in cooperation with the top plate and the bottom plate, defines an interior volume. In an exemplary embodiment, the sidewall includes four walls that cooperate to form a structure having a generally rectangular cross-section.

Each of the plurality of bushing members is formed of a low-friction material and is positioned (e.g., removably positioned) within the interior volume. In some embodiments, the bushing members are positioned in receptacles sized and shaped for receipt thereof. In embodiments where the outer housing has a generally rectangular cross-section, the receptacles may be positioned at or near corners of the outer housing defined by two of the walls. In embodiments, the bushing members include a surface cylindrically curved about a central longitudinal axis extending between the top and bottom portions of the sidewall. The cylindrically curved surfaces, in cooperation with the openings in the top and bottom plates, define a cylindrical passage through the interior volume that is sized and shaped for receiving a cylindrical tube, for instance, a lower portion of a swivel elbow component configured for connecting with a water supply column of a mechanized irrigation system.

In operation, the cylindrically curved surfaces of the bushing members contact a tube (e.g., the lower portion of a swivel elbow component configured to connect with a water supply column of a mechanized irrigation system) received within the cylindrical passage. Due to the material from which the bushing members are formed (e.g., a low-friction material), such positioning permits rotation of the tube within the passage without the need for grease or other lubrication.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different components, steps, or combinations of components and/or steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure provide a pivot center swivel and bearing device that permits adequate rotation of a coupled cylindrical tube without the need for grease or other lubricant that can damage portions of the device, cause a mess, and necessitate regular maintenance. In embodiments, the greaseless pivot center swivel and bearing device includes an outer housing having a sidewall, a top plate, a bottom plate, and a plurality of bushing members. The sidewall of the outer housing includes a top portion and a bottom portion. The top plate is coupled with the top portion of the sidewall and the bottom plate is coupled with the bottom portion of the sidewall. Each of the top and bottom plates includes an opening therein. The sidewall includes at least one wall that, in cooperation with the top plate and the bottom plate, defines an interior volume. In an exemplary embodiment, the sidewall of the outer housing includes four walls that cooperate to form a structure having a generally rectangular cross-section. In an exemplary embodiment, the outer housing has a cross-section that is generally square. It will be understood and appreciated by those having ordinary skill in the art however, that embodiments of the disclosure contemplate housings having cross-sections of any geometric shape.

Each of the plurality of bushing members is formed of a low-friction material and is positioned (e.g., removably positioned) within the interior volume. In some embodiments, the bushing members are positioned in receptacles sized and shaped for receipt thereof. In embodiments where the outer housing has a generally rectangular cross-section, the receptacles may be positioned at or near corners of the outer housing defined by two of the walls. In embodiments, the bushing members include a surface cylindrically curved about a central, longitudinal axis extending between the top and bottom portions of the sidewall. The cylindrically curved surfaces, in cooperation with the openings in the top and bottom plates, define a cylindrical passage through the interior volume sized and shaped for receiving a cylindrical tube, for instance, a lower portion of a swivel elbow component configured for connecting with a vertical water supply column of a mechanized irrigation system.

In operation, the cylindrically curved surfaces of the bushing members contact a tube received within the cylindrical passage. Due to the material from which the bushing members are formed (e.g., a low-friction material), such positioning permits rotation of the tube within the passage without the need for grease or other lubrication.

Embodiments of the present disclosure may be utilized in connection with irrigation systems. As used in this application, the term "irrigation system" refers to any type of mechanized irrigation equipment. Exemplary types of mechanized irrigation equipment and systems include, but are not limited to, center pivot, lateral move, and combinations thereof. A center pivot irrigation system comprises a horizontal irrigation pipeline connected to a vertical water supply column at a pivot point. Towers with motorized wheels are located along the length of the horizontal irrigation pipeline. Trusses may be used to support the pipeline between the towers. Cables may run along the pipeline or trusses to provide electricity to the motors that move the wheels on the towers and to various electrical components. The center pivot irrigation system moves in an arc centered at the pivot point. Sprinklers that distribute water to crops as the irrigation system moves around the arc are arranged along the irrigation pipeline.

Figure 1:
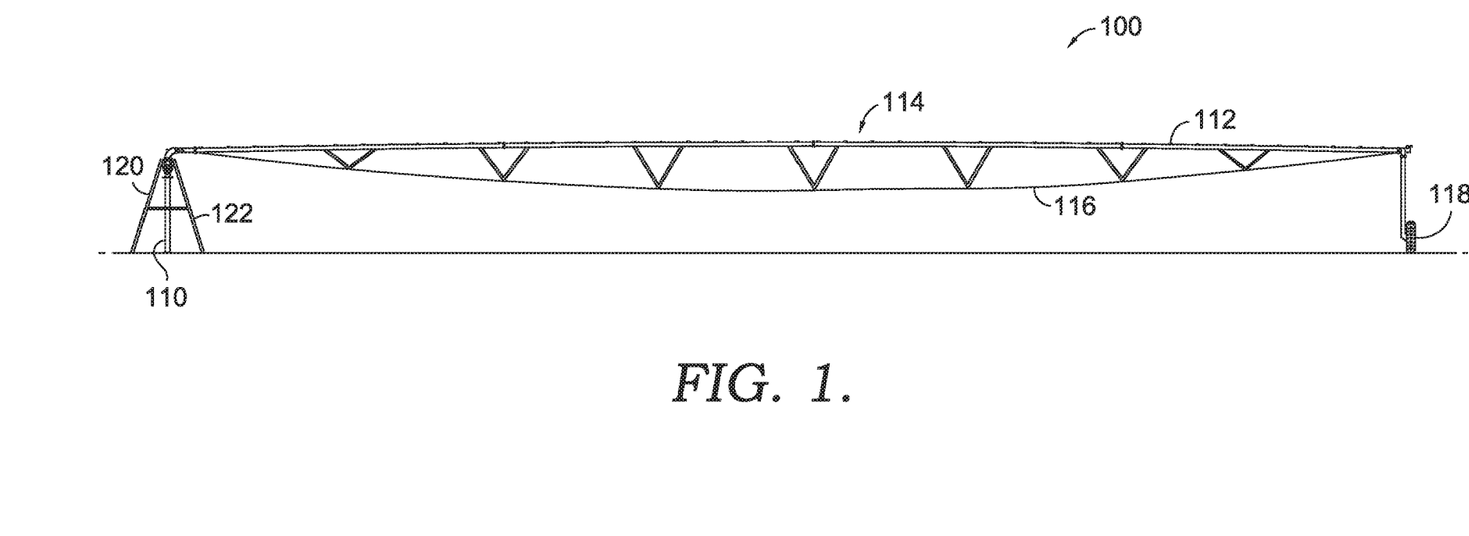
FIG. 1 is a schematic diagram depicting a side elevation view of a section of an exemplary mechanized irrigation system of the center pivot type suitable for implementing aspects of the disclosure.

Turning now to FIG. 1, a schematic view in side elevation of a section of an exemplary mechanized irrigation system 100 of the center pivot type suitable for use with the greaseless swivel and bearing device and assembly of the present disclosure is shown. As mentioned, aspects of the disclosure are not limited to use on center pivot irrigation systems. The mechanized irrigation system 100 extends from a vertical water supply column 110 configured for accessing water from a water resource, such as a well. In one aspect, the vertical water supply column 110 is of a suitable structural material such as galvanized steel, aluminum, or the like. One or more pumps (not shown) associated with the mechanized irrigation system 100 supply water to a horizontal irrigation pipeline 112, which runs the length of the irrigation system 100.

The mechanized irrigation system 100 comprises a span 114. The span 114 includes the substantially horizontal irrigation pipeline 112 that is supported by a truss 116 and extends between the vertical water supply column 110 and a motorized tower 118. In one aspect, the irrigation pipeline 112 is formed from a suitable structural material such as galvanized steel, aluminum, or the like. Sprinklers (not shown) may be positioned along the irrigation pipeline 112. Sprinklers used with the exemplary irrigation system 100 may include, by way of example only, impact sprinklers, rotator style sprinklers, and drip lines. A cable (not shown) runs the length of the irrigation pipeline 112 and provides power, and possibly control and communications, to the motorized tower 118 and other electrical components positioned along the span 114. A center pivot tower 120 having a plurality of legs 122 supports the vertical water supply column 110 and prevents lateral movement thereof.

To couple the vertical water supply column 110 with the substantially horizontal irrigation pipeline 112, embodiments of the disclosure contemplate use of a greaseless swivel and bearing device. With reference to FIGS. 2-7, an exemplary greaseless swivel and bearing assembly 200 having a greaseless swivel and bearing device 210 coupled with a cylindrical inner tube 212 having a circular cross-section is shown. It will be understood and appreciated by those having ordinary skill in the art that inner tubes having cross-sections other than circular may be utilized within the scope of embodiments hereof. Inner tubes having cross-sections of any geometric shape are contemplated.

Figure 2:
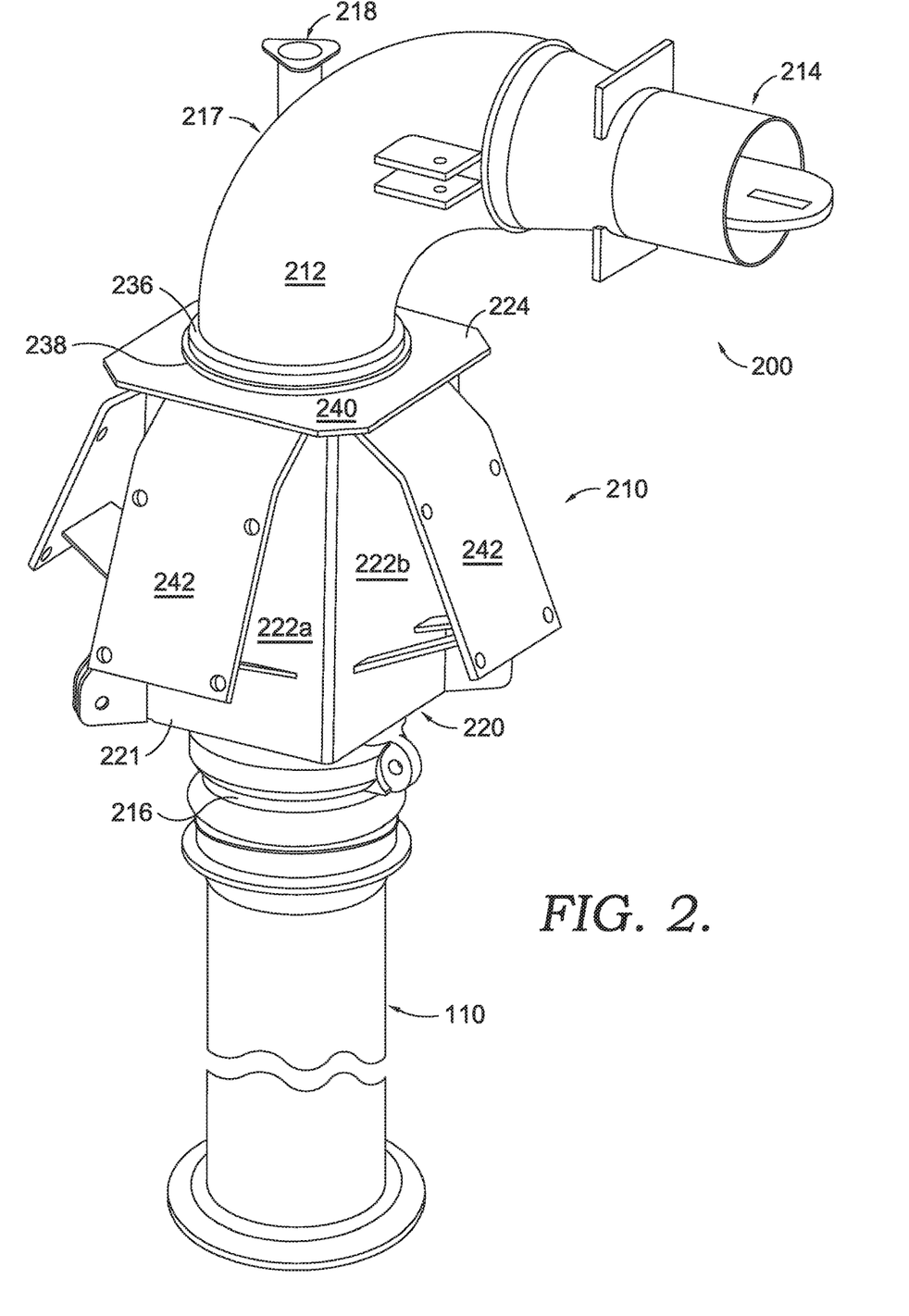
FIG. 2 is a fragmentary, perspective view of an exemplary greaseless swivel and bearing assembly, in accordance with aspects of the disclosure.

The inner tube 212 includes a first end 214 configured for connecting, for instance, to the substantially horizontal irrigation pipeline 112 of FIG. 1, and a second end 216 configured for connecting, for instance, to the vertical water supply column 110 of FIG. 1. The inner tube 212 further includes a curved portion 217 that provides a radius ninety-degree sweep transitioning the vertical water flow at the second end 216 of the inner tube 212 to the horizontal flow at the first end 214 of the inner tube 212. The illustrated inner tube 212 additionally includes, or is coupled with, a socket 218, also known as a J-pipe coupling, configured to connect, for instance, the electrical conduit from an irrigation system main electrical power distribution framework to a span (e.g., the span 114 of FIG. 1). An opening 219 permits electrical cables (not shown) to enter into the vertical water column in the vertical supply column 110. The cables then travel up into the cylindrical inner tube 212 and out the socket 218. This arrangement allows the span 114 to rotate about the water supply column 110 without tangling the cables.

The illustrated embodiment of the greaseless swivel and bearing device 210 includes an outer housing 220 having a sidewall 221 comprised of a plurality of walls 222*a-d*, a top plate 224 (also referred to herein as a "first end plate"), and a bottom plate 226 (also referred to herein as a "second end plate"). The illustrated assembly 200 includes four substantially identically shaped and sized walls 222*a-d* configured such that a structure having a generally square cross-section is formed. It will be understood and appreciated by those having ordinary skill in the art that while an outer housing 220 having a square cross-section is illustrated in FIGS. 2-7, an outer housing having a cross-section of any geometric shape is contemplated to be within the scope of embodiments of the present disclosure. An outer housing having a square cross-section as illustrated is easy to manufacture and is capable of providing the structural rigidity required to support and sustain loads applied in irrigation system applications. The square outer dimension of the outer housing 220 additionally provides a support and mounting platform, or surface, for accessories to be attached, or affixed, including other distributive structural members such as, by way of example only, mounting plates 242 for attaching the legs 122 of the center pivot tower 120 (FIG. 1), sensors (e.g., cameras, vibration sensors and load sensors), circular track for switches, and other electronic or electromechanical components. As illustrated, each of the walls 222*a-d* includes a structural member in the nature of mounting plates 242 attached thereto.

The top plate 224 is connected to the top portion 228 of the sidewall 221 of the outer housing 220. In embodiments, the top plate 224 is configured to prevent environmental contamination to components positioned within the greaseless swivel and bearing device 210 by acting as a cover to the device 210. In a similar fashion, the bottom plate 226 is connected to the bottom portion 230 of the sidewall 221 of the greaseless swivel and bearing device 210. In embodiments, the bottom plate 226 may include one or more openings (not shown) for venting purposes. Each of the top plate 224 and the bottom plate 226 includes an opening therein 232, 234, respectively, that is sized and shaped for receiving the cylindrical inner tube 212.

The illustrated greaseless swivel and bearing device 210 further includes a swivel ring 236 and a swivel washer 238. The swivel ring 236 is a circular ring that is coupled with an exterior surface of a portion of the cylindrical inner tube 212 that is positioned above a top surface 240 of the top plate 224. The swivel ring 236 is affixed to the exterior surface of the cylindrical inner tube 212 so as to set the vertical position of the inner tube 212 within the greaseless swivel and bearing assembly 200. The swivel ring 236 also evenly distributes the load from the vertical axis and provides a mating surface for the swivel washer 238. The swivel washer 238 is positioned just below the swivel ring 236. Though the illustrated embodiment shows a single swivel washer 238, additional swivel washers may be employed within embodiments of the present disclosure based upon clearance requirements. The material of the swivel washer 238 provides a smooth or slick surface enabling rotational movement when vertical axial loads are applied to the assembly 200. The top plate 224 provides a load bearing surface for the swivel washer 238 and adjacent swivel ring 236.

The walls 222*a-d*, the top plate 224, and the bottom plate 226 cooperate to define an interior volume 244. Positioned within the interior volume 244 is a plurality of bushing members 246. In embodiments, each of the plurality of bushing members 246 is removably positioned within the interior volume 244. Suitable materials for the bushing members 246 include low-friction materials such as plastics and/or composites, for instance, Ultra-High-Molecular-Weight (UHMW) polyethylene.

Figures 3, 4:
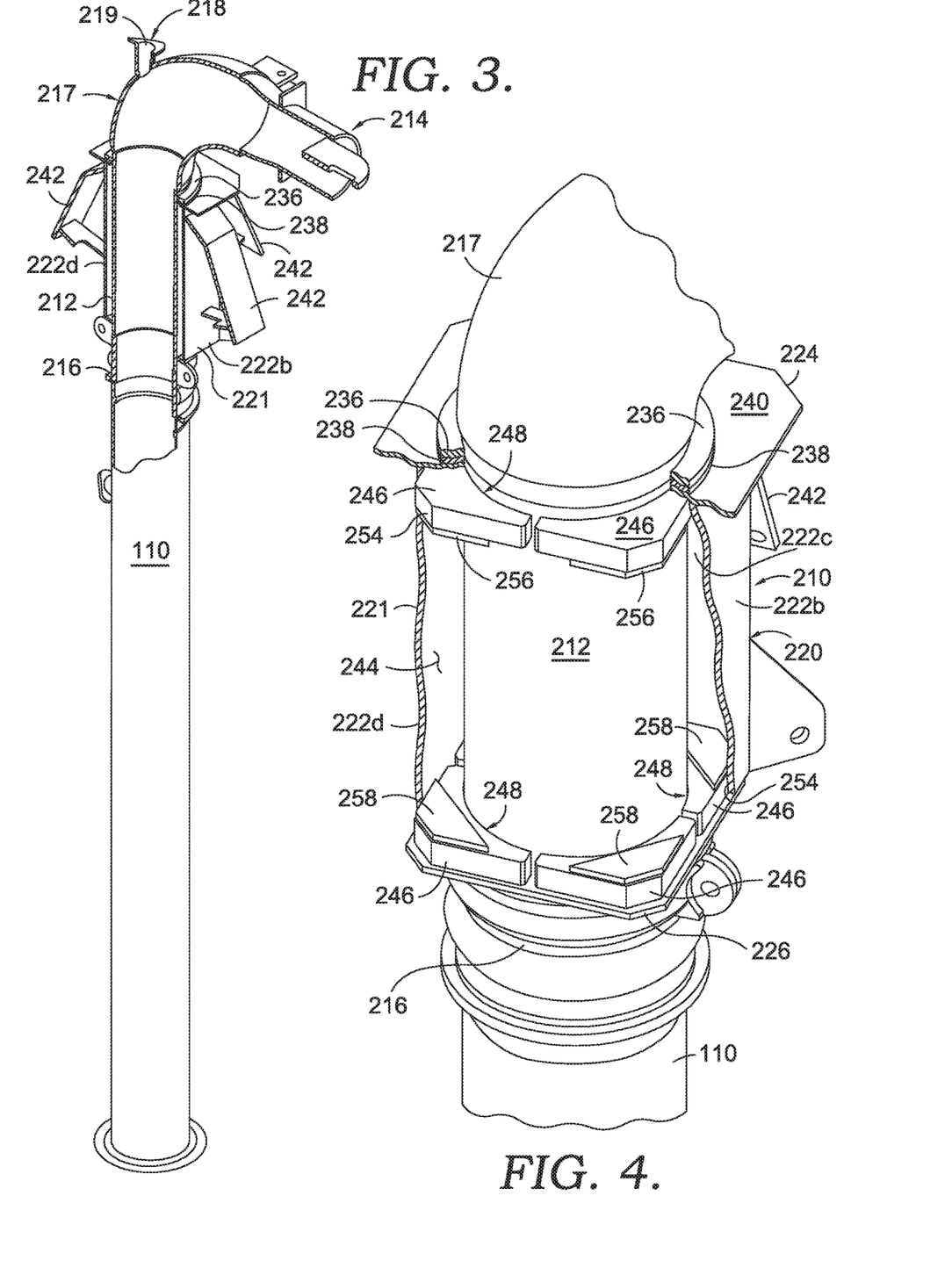
FIG. 3 is a fragmentary, perspective view of the greaseless swivel and bearing assembly of FIG. 2, with a portion thereof shown in cross-section.
FIG. 4 is an enlarged, fragmentary, perspective view of the greaseless swivel and bearing assembly of FIG. 2, with portions of the assembly cut away for clarity.

As best seen in FIG. 4, in embodiments, a first portion of the plurality of bushing members 246 is positioned adjacent the top plate 224 and around or about the opening 232 in the top plate 224 and a second portion of the plurality of bushing members 246 is positioned adjacent the bottom plate 226 and around or about the opening 234 in the bottom plate 226. Each bushing member 246 includes an inwardly facing surface 248 that is cylindrically curved about a central, longitudinal axis 250 extending between the top plate 224 of the outer housing 220 and the bottom plate 226 of the outer housing 220. The opening 232 in the top plate 224, the opening 234 in the bottom plate 226, and the cylindrical surfaces 248 of the bushing members 246 cooperate to form a cylindrical passage 252 through the interior volume 244 that is sized to receive the cylindrical inner tube 212.

In embodiments, a plurality of bushing receptacles 254 is positioned within the interior volume 244, each bushing receptacle 254 sized and shaped for receiving one of the plurality of bushing members 246. As best seen in the embodiment illustrated in FIG. 4, bushing receptacles 254 configured for receiving the first portion of the bushing members 246 (i.e., those bushing members 246 positioned adjacent the top plate 224 and around or about the opening 232 in the top plate 224) are formed by the top plate 224, walls 222*a-d* of the outer housing 220, and a lower shelf structure 256. Bushing receptacles 254 configured for receiving the second portion of the bushing members 246

(i.e., those bushing members 246 positioned adjacent the bottom plate 226 and around or about the opening 234 in the bottom plate 226) are formed by the bottom plate 226, walls 222a-d of the outer housing 220, and an upper shelf structure 258. It will be understood and appreciated by those having ordinary skill in the art that bushing receptacles 254 may take any number of forms in accordance with embodiments of the present disclosure so long as they are sized and shaped to receive bushing members 246 therein. The illustrated embodiment is exemplary only.

Bushing members 246 may take the form of bushing blocks or slip blocks in accordance with embodiments of the present disclosure. Bushing blocks 246 are objects that are designed to fit within receptacles (e.g., bushing receptacles 254) in the interior volume 244. Such blocks provide a mating or bearing surface to the cylindrical inner tube 212 (i.e., the curved surfaces 248) and are formed from materials that are smooth and slick, thereby providing easy swivel operation for the cylindrical inner tube 212. In such embodiments, once the cylindrical inner tube 212 in positioned within the swivel and bearing device 210, the bushing blocks are unable to be removed or repositioned without dismantling the assembly 200.

Slip blocks are similar to bushing blocks 246 and also are designed to fit within receptacles (e.g., bushing receptacles 254) in the interior volume 244. Slip blocks differ from bushing blocks, however, in that slip blocks are adjustable over time. Slip blocks provide an adjusting rod mechanism that extends outside the outer housing 218. Adjusting the rod moves the slip block in or out of the bushing receptacle providing the ability to fine-tune the bearing surfaces during initial product setup. Once set, this adjustment is not needed and no regular maintenance intervals are required. An alternate design to the adjustable rod mechanism is a self-adjusting spring-style mechanism preventing the need for manual intervention during installation. The spring-style mechanism would continually bias slip blocks toward the central longitudinal axis 250 at the center of the outer housing 220. Any and all such variations, and any combination thereof, are contemplated and are within the scope of embodiments of the present disclosure.

Figure 5:
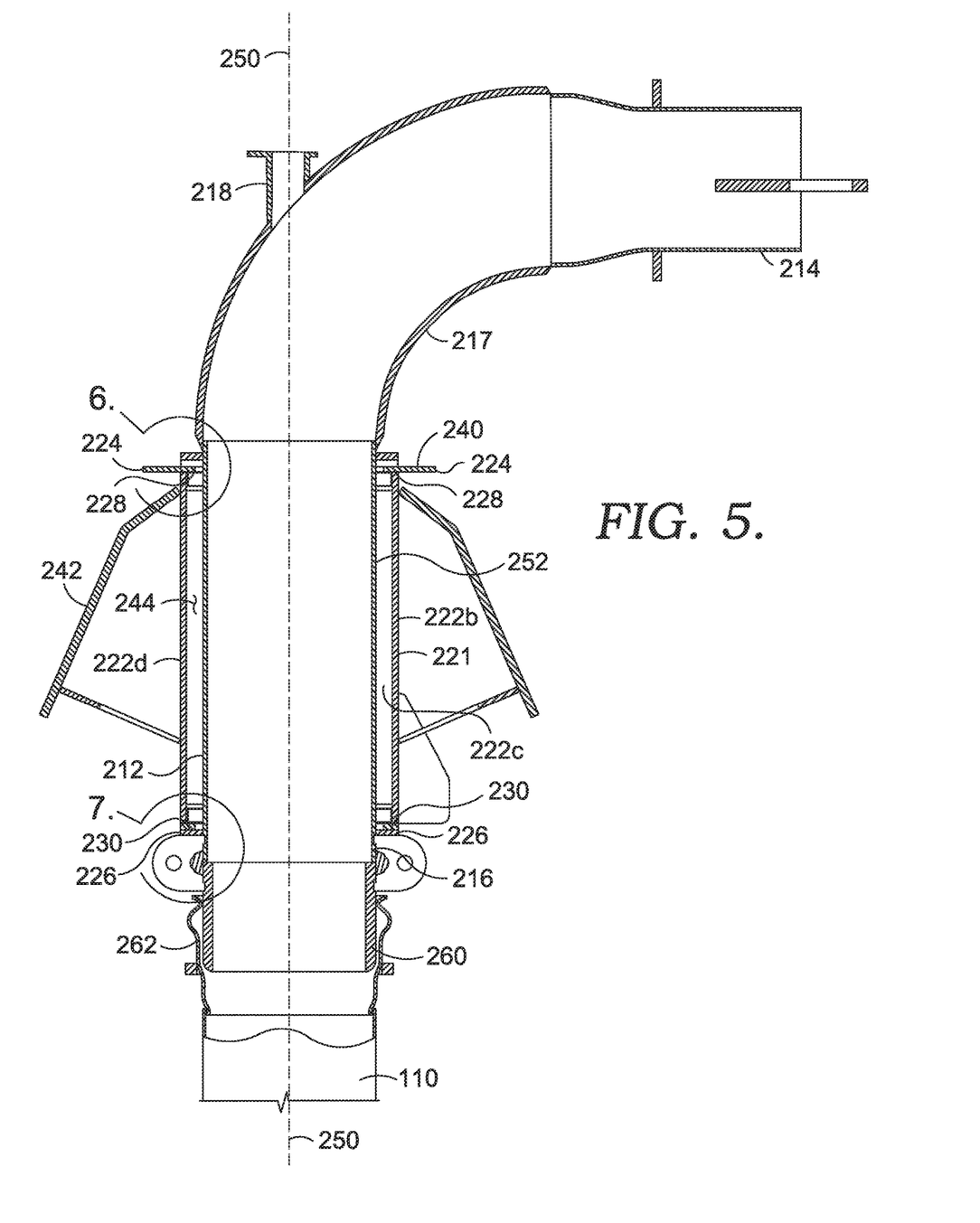
FIG. 5 is a side elevation view in cross-section of the greaseless swivel and bearing assembly of FIG. 2.
Figure 6:
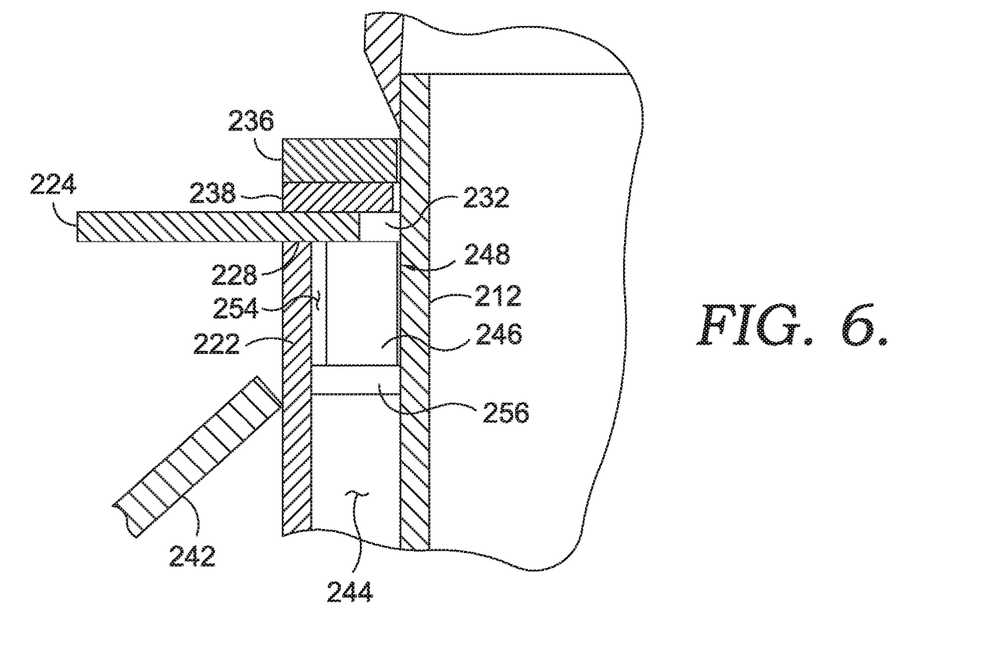
FIG. 6 is an enlarged, fragmentary view in partial cross-section of the greaseless swivel and bearing assembly of FIG. 5, taken at line 6 thereof.

As best illustrated in FIG. 5, the second end 216 of the inner tube 212 is preferably coupled with a replaceable pipe section 260 via a clamp 262. The pipe section 260 is received in a coupler 262 located at an uppermost end of the stationary vertical water supply column 110. Accordingly the pipe section 260 rotates within the stationary coupler 262 as the span 114 rotates about the vertical supply column. While the inner tube 212 could itself extend down into the coupler 262, some wear can be experienced on the portion of the pipe rotating within the coupler 262. Further, because the pipe section 260 is of a short length, higher quality and/or thicker material can be used without having to use the same for the entire length of the inner tube 212. For example, the pipe section 260 and/or the inner tube 212 can be made out of a one or a combination of non-corrosive materials.

Figure 7:
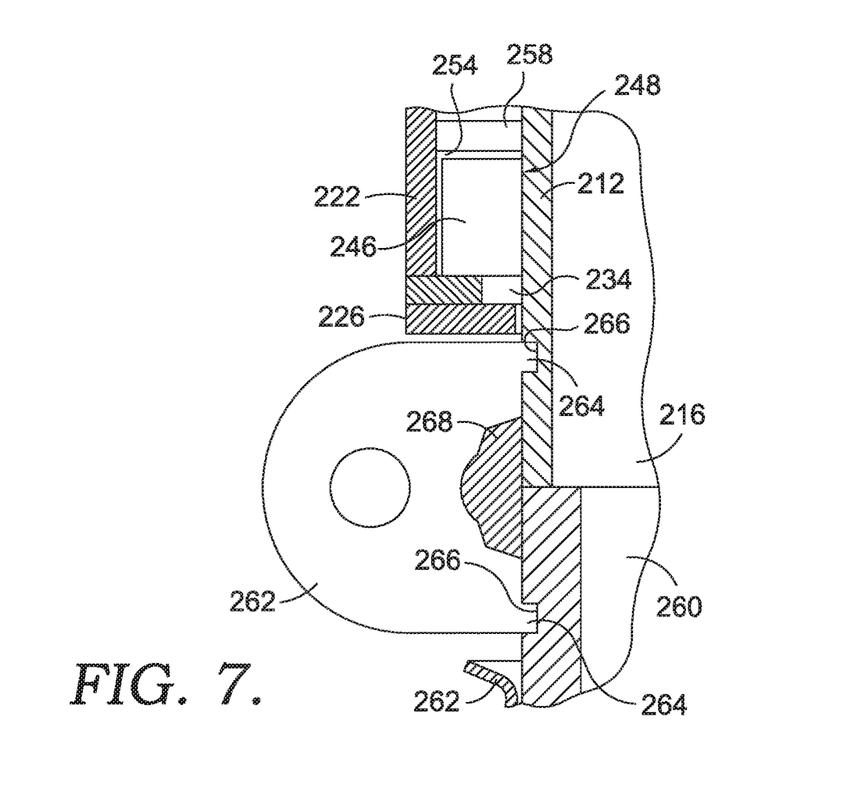
FIG. 7 is an enlarged, fragmentary view in partial cross-section of the greaseless swivel and bearing assembly of FIG. 5, taken at line 7 thereof.

As best illustrated in FIG. 7, the clamp 262 mechanically couples the second end 216 of the inner tube 212 with the replaceable pipe section 262, The clamp 262 not only prevents lateral movement between the inner tube 212 and the pipe section 260, it also prevents separation between the inner tube 212 and the pipe section along the longitudinal axis. In particular, the clamp 262 includes a pair of ridges 264 adjacent its upper and lower edges that project inwardly. The ridges 264 are received in channels or grooves 266 that circumscribe the outer surface of both the inner tube 212 and the pipe section 260. A gasket 268 makes the connection between the second end 216 of the inner tube 212 and the removable pipe section 262 watertight.

Figure 8:
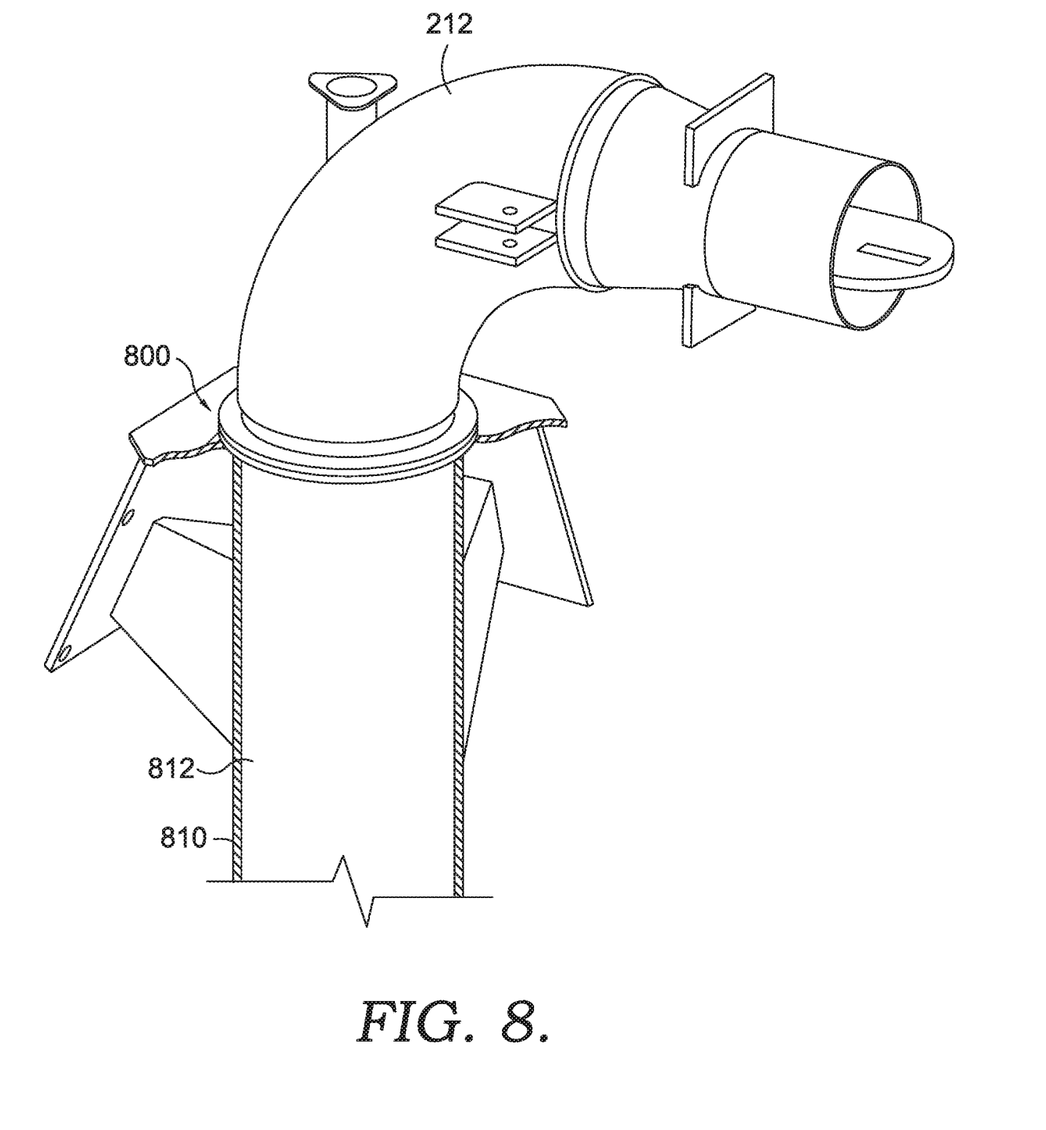
FIG. 8 is a fragmentary, perspective view of a greaseless swivel and bearing assembly in accordance with a second embodiment of the present invention, with portions thereof cut away for clarity.
Figure 9:
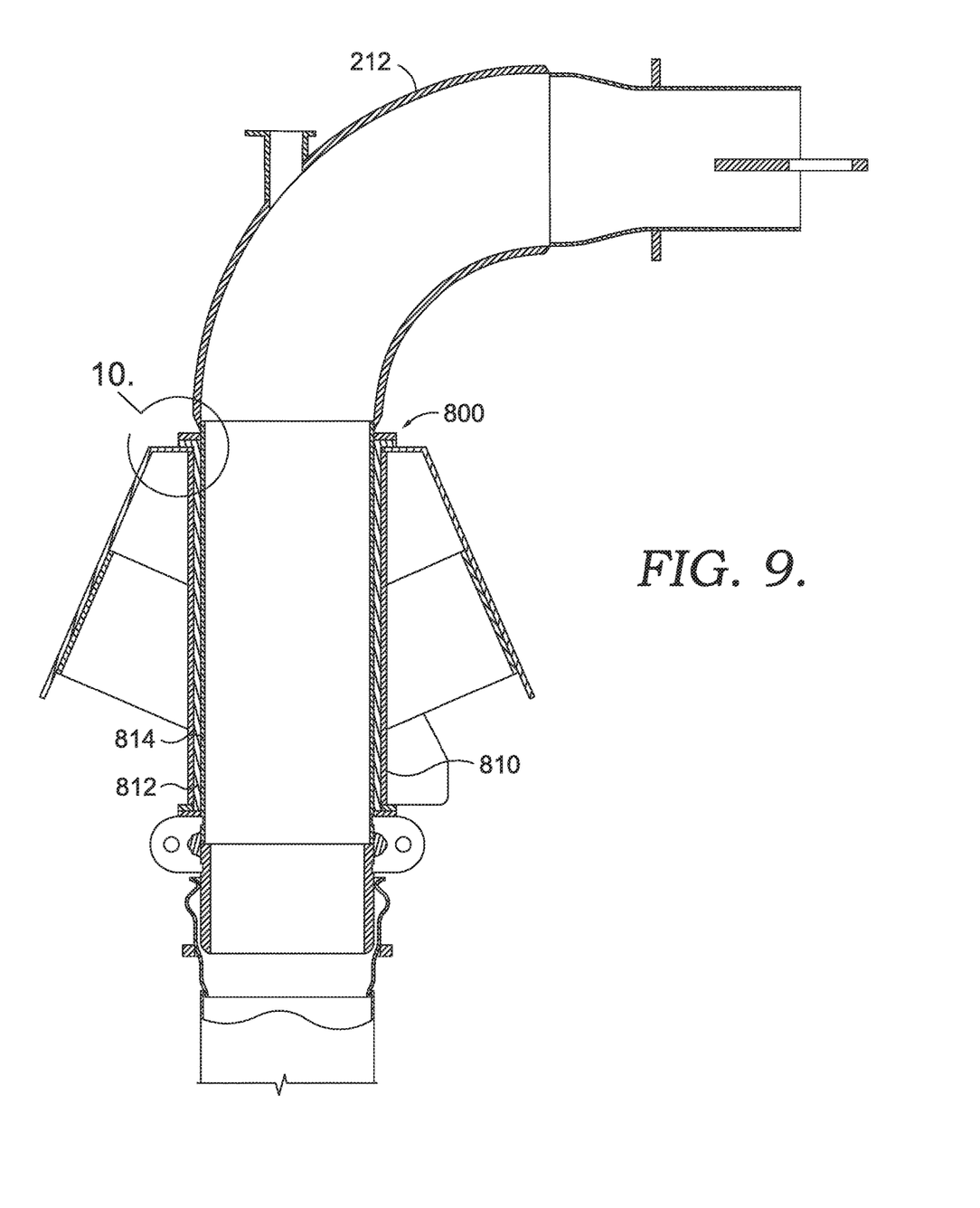
FIG. 9 is a side elevation view in cross-section of the greaseless swivel and bearing assembly of FIG. 8.
Figure 10:
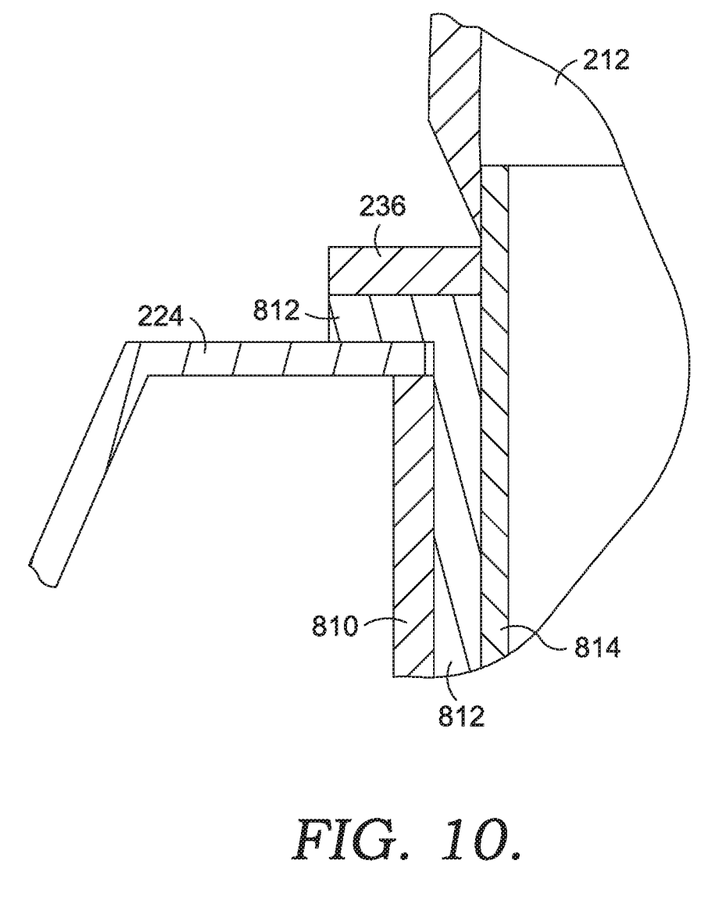
FIG. 10 is an enlarged view of the greaseless swivel and bearing assembly of FIG. 9, taken at line 10 thereof.

Another exemplary embodiment of a greaseless swivel and bearing assembly 800 is illustrated in FIGS. 8-10. This embodiment differs from the embodiment described above in that instead of multiple bushing blocks 246 cooperating to encircle the cylindrical inner tube 212 and collectively provide a bearing surface a single, unitary bushing is provided to accomplish the same thing. The illustrated embodiment includes a substantially cylindrical outer housing 810, a substantially cylindrical bearing sleeve 812, and a substantially cylindrical inner tube 814. Each of the outer housing 810, the bearing sleeve 812, and the inner tube 814 has a substantially circular cross-section. The outer housing 810 has an inner diameter that is larger than an outer diameter of the cylindrical bearing sleeve 812. The cylindrical bearing sleeve 812, in turn, has an inner diameter that is larger than an outer diameter of the cylindrical inner tube 814. Suitable materials for the cylindrical bearing sleeve 812 include low-friction materials such as plastics and/or composites, for instance, NYLATRON or Ultra-High-Molecular-Weight (UHMW) polyethylene. The inner diameter of the outer housing 810 is of a suitable structural material such as galvanized steel, aluminum, or the like.

The outer surface of the substantially cylindrical bearing sleeve 812 movably contacts the inner surface of the cylindrical outer housing 810 and the inner surface of the substantially cylindrical bearing sleeve 812 movably contacts the outer surface of the cylindrical inner tube 814. As with the prior described embodiments, such an arrangement permits rotational movement of the cylindrical inner tube 814 without the need for grease or other lubricants that can damage portions of the assembly 810, cause a mess, and necessitate regular maintenance.

Aspects of the disclosure have been described to be illustrative rather than restrictive. It will be understood that certain features and sub-combinations are of utility and may be employed without reference to other features and sub-combinations. This is contemplated by and is within the scope of the claims.

What is claimed is:

1. A swivel and bearing device, comprising:
an outer housing having a sidewall with a first end portion and a second end portion spaced from one another;
a first end plate coupled with the first end portion of the sidewall, the first end plate having a first opening there through;
a second end plate coupled with the second end portion of the sidewall, the second end plate having a second opening there through, wherein the sidewall and the first and second end plates cooperate to define an interior volume that extends between the first end plate and the second end plate;
a plurality of bushing members positioned within the interior volume, wherein the first and second openings and the bushing members cooperate to define a passage through the interior volume; and
a swivel ring coupled with an exterior surface of first end plate outside of the interior volume and adjacent to the first opening of the first end plate.

2. The swivel and bearing device of claim 1, wherein a first portion of the plurality of bushing members is positioned adjacent the first end plate and a second portion of the plurality of bushing members is positioned adjacent the second end plate.

3. The swivel and bearing device of claim 2, wherein each bushing member of the first portion of the plurality of bushing members is positioned about the first opening and each bushing member of the second portion of the plurality of bushing members is positioned about the second opening.

4. The swivel and bearing device of claim 2, wherein each of the plurality of bushing members includes a surface cylindrically curved about a longitudinal axis extending between the first and second end plates, and wherein the cylindrically curved surfaces of each bushing member of the first portion of the plurality of bushing members and the cylindrically curved surfaces of each bushing member of the second portion of the plurality of bushing members cooperate with the first opening and the second opening to define the cylindrical passage through the interior volume.

5. The swivel and bearing device of claim 1, further comprising a plurality of bushing receptacles positioned within the interior volume, wherein each of the plurality of bushing members is positioned within one of the plurality of bushing receptacles.

6. The swivel and bearing device of claim 5, wherein each of the plurality of bushing members is removably positioned within one of the plurality of bushing receptacles.

7. The swivel and bearing device of claim 1, wherein each of the plurality of bushing members is comprised of a low-friction material.

8. The swivel and bearing device of claim 1, wherein the sidewall of the outer housing comprises four walls that cooperate to form a structure having a rectangular cross-section.

9. The swivel and bearing device of claim 8, wherein each of the plurality of bushing members is positioned at a corner defined by two of the four walls of the outer housing.

10. The swivel and bearing device of claim 8, wherein each of the four walls comprises an interior surface and an exterior surface, and wherein the swivel and bearing device further comprises a structural member coupled with each of the exterior surfaces.

11. A swivel and bearing device, comprising:
an outer housing having a plurality of walls that cooperate to form a structure having a rectangular cross-section;
a top plate coupled with a top portion of the outer housing, the top plate having a first opening therein that is sized and shaped for receiving a cylindrical tube;
a bottom plate coupled with a bottom portion of the outer housing, the bottom plate having a second opening therein that is sized and shaped for receiving the cylindrical tube, wherein the plurality of walls, the top plate, and the bottom plate cooperate to define an interior volume that extends between the top plate and the bottom plate of the outer housing;
a plurality of bushing members positioned within the interior volume; and
a swivel ring coupled with an exterior surface of the first end plate outside of the interior volume and adjacent to the first opening of the first end plate.

12. The swivel and bearing device of claim 11, wherein a first portion of the plurality of bushing members is positioned adjacent the top plate and circumferentially about the first opening, and a second portion of the plurality of bushing members is positioned adjacent the bottom plate and circumferentially about the second opening.

13. The swivel and bearing device of claim 12, wherein each of the plurality of bushing members includes a surface cylindrically curved about a longitudinal axis extending between the top and bottom plates, and wherein the cylindrically curved surfaces of the first portion of the plurality of bushing members and the cylindrically curved surfaces of the second portion of the plurality of bushing members cooperate with the first and second openings to define a cylindrical passage through the interior volume that is sized and shaped for receiving the cylindrical tube.

14. The swivel and bearing device of claim 11, further comprising a plurality of bushing receptacles positioned within the interior volume at a corner defined by two of the plurality of walls, wherein each of the plurality of bushing members is positioned within one of the plurality of bushing receptacles.

15. The swivel and bearing device of claim 14, wherein each of the plurality of bushing members is removably positioned within one of the plurality of bushing receptacles.

16. The swivel and bearing device of claim 11, wherein each of the plurality of bushing members is comprised of a low-friction material.

17. A swivel and bearing assembly, comprising:
an outer housing having a sidewall having a top portion and a bottom portion;
a top plate coupled with the top portion of the sidewall, the top plate having a first opening therein;
a bottom plate coupled with the bottom portion of the sidewall, the bottom plate having a second opening therein, wherein an interior surface of the sidewall, an interior surface of the top plate and an interior surface of the bottom plate cooperate to define an interior volume;
a cylindrical tube having a straight portion positioned within the interior volume and extending between the first opening and the second opening;
a first plurality of bushing members positioned within the interior volume, adjacent the top plate, and circumferentially about the cylindrical tube;
a second plurality of bushing members positioned within the interior volume, adjacent the bottom plate, and circumferentially about the cylindrical tube; and
a swivel ring coupled with an exterior surface of the first end plate outside of the interior volume and adjacent to the first opening of the first end plate.

18. The swivel and bearing assembly of claim 17, further comprising a swivel washer positioned between the swivel ring and the exterior surface of the top plate.

19. The swivel and bearing assembly of claim 17, wherein each bushing member of the first plurality of bushing members and each bushing member of the second plurality of bushing members is comprised of a low-friction material.

* * * * *